United States Patent
Stanley et al.

(10) Patent No.: US 7,559,843 B2
(45) Date of Patent: Jul. 14, 2009

(54) METHOD AND APPARATUS FOR PROVIDING REAL-TIME MACHINE LEARNING TO COMPUTER-CONTROLLED AGENTS USED IN VIDEO GAMES

(75) Inventors: Kenneth O. Stanley, Austin, TX (US); Risto Miikkulainen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 411 days.

(21) Appl. No.: 11/197,065

(22) Filed: Aug. 4, 2005

(65) Prior Publication Data

US 2006/0047612 A1    Mar. 2, 2006

Related U.S. Application Data

(60) Provisional application No. 60/600,446, filed on Aug. 11, 2004.

(51) Int. Cl.
| | |
|---|---|
| A63F 9/24 | (2006.01) |
| A63F 13/00 | (2006.01) |
| G06F 17/00 | (2006.01) |
| G06F 19/00 | (2006.01) |
| G06N 3/02 | (2006.01) |

(52) U.S. Cl. ............................. 463/42; 463/43; 463/21; 463/23; 706/15

(58) Field of Classification Search .................. 463/42, 463/43, 21, 23; 706/15
See application file for complete search history.

(56) References Cited

U.S. PATENT DOCUMENTS

| 4,582,323 A | * | 4/1986 | Minkoff et al. ................. 463/4 |
| 6,449,603 B1 | * | 9/2002 | Hunter ........................ 706/15 |
| 7,117,202 B1 | * | 10/2006 | Willoughby .................... 707/3 |
| 2005/0245303 A1 | * | 11/2005 | Graepel et al. ................. 463/1 |
| 2005/0277100 A1 | * | 12/2005 | Bagley et al. ............... 434/323 |
| 2007/0197877 A1 | * | 8/2007 | Decorte et al. .............. 600/300 |

* cited by examiner

*Primary Examiner*—John M Hotaling, II
*Assistant Examiner*—Adetokunbo Torimiro
(74) *Attorney, Agent, or Firm*—Winstead P.C.

(57) ABSTRACT

A method for providing real-time machine learning to agents used in video games is disclosed. Initially, adjusted fitnesses of a set of agents within a population are determined. An agent having a relatively low adjusted fitness is then removed from the population. Subsequently, a parent agent is probabilistically selected from the population to generate an offspring agent. Finally, the removed agent is replaced by the offspring agent, maintaining a continuous real-time replacement cycle.

18 Claims, 2 Drawing Sheets

METHOD AND APPARATUS FOR PROVIDING REAL-TIME MACHINE LEARNING TO COMPUTER-CONTROLLED AGENTS USED IN VIDEO GAMES

PRIORITY CLAIM

The present application claims priority to U.S. Provisional Application No. 60/600,446 filed on Aug. 11, 2004, which is incorporated herein by reference in its entirety.

BACKGROUND OF THE INVENTION

1. Technical Field

The present invention relates to video games in general, and in particular to interactive video games. Still more particularly, the present invention relates to a method and apparatus for providing real-time machine learning to computer-controlled agents used in interactive video games.

2. Description of Related Art

As the video game market continues to expand, video games have become a facet of many people's lives. One of the most compelling, yet least exploited, technologies that can be applied to video games (or other interactive simulation applications) is machine learning.

In the field of video games, the term non-player character refers to an autonomous computer-controlled agent in a video game. The behavior of an autonomous computer-controlled agent in current video games is often repetitive and predictable. The scripts in most video games simply cannot learn or adapt to change computer-controlled agents, and as a result, opponents will always make the same moves and the video game quickly becomes boring.

Machine learning can potentially keep video games interesting by allowing computer-controlled agents to change and adapt. However, a major problem with machine learning in video games is that if the behaviors of computer-controlled agents are allowed to change without any type of control, the game content can become unpredictable. For example, computer-controlled agents may learn idiosyncratic behaviors or even not learn at all, making the gaming experience of a video game player unsatisfying. One way to avoid such a problem is to train computer-controlled agents to perform complex behaviors offline, and then upload the results into the final version of the video game intended for public consumption. However, although the video game will become more interesting with offline machine training, computer-controlled agents still cannot adapt and change in response to the tactics of a skillful video game player.

Consequently, it is desirable to provide a method for providing online machine learning to computer-controlled agents used in video games such that the computer-controlled agents can adapt and change in real-time during game play.

SUMMARY OF THE INVENTION

In accordance with a preferred embodiment of the present invention, adjusted fitnesses of a set of agents within a population are determined. An agent having a relatively low adjusted fitness is then removed from the population. Subsequently, a parent agent is probabilistically selected from the population to generate an offspring agent. Finally, the removed agent is replaced by the offspring agent, maintaining a continuous real-time replacement cycle.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. NEAT

The Neuroevolution of Augmenting Topologies (NEAT) method is a technique for evolving neural networks for complex reinforcement learning tasks using an evolutionary algorithm (EA). Using historical markings on genes and speciation of the population, the NEAT method combines the common search for appropriate network weights with the complexification of a network structure, which allows the behavior of evolved neural networks to become increasingly sophisticated over generations.

Like most EAs, the NEAT method was originally designed to be run offline. Agents within a population are evaluated one or two at a time, and after the entire population has been evaluated, a new population is created to form the next generation. In other words, with a standard EA, it is not possible for a human to interact with agents while they are evolving.

II. rtNEAT

Real-time Neuroevolution of Augmenting Topologies (rt-NEAT) modifies the NEAT method to allow a video game player to interact with evolving agents of a video game in real-time. rtNEAT is able to preserve the usual dynamics of the NEAT method (i.e., protection of innovation through speciation and complexification) but is also powerful enough to meet the demands of modern video games. rtNEAT is based on the observation that in a video game, the entire population of agents plays at the same time. Thus, fitness statistics of agents within a video game are collected constantly as the video game is being played.

In principle, agents within a video game can be evolved continuously during game play. However, replacing all agents within a population simultaneously on each generation as in NEAT will look incongruous to a video game player because behaviors of all characters are changed at the same time, even though their behaviors remain static throughout the large gaps of time between generations. Thus, the question becomes how agents can be replaced continuously so that offsprings can be evaluated in real-time while still maintaining the same dynamics as the NEAT method.

The solution is to replace one agent every few game ticks. Specifically, one of the worst agents is removed and replaced by a child of parents chosen from among the best. If such a cycle of removal and replacement happens continually throughout the video game, the effects of evolution should be largely invisible to a video game player.

While the NEAT method assigns offsprings to species en masse for each new generation, rtNEAT only produces one new offspring at a time. Therefore, the reproduction cycle must be modified to allow rtNEAT to speciate in real-time. Such a reproduction cycle constitutes the core of rtNEAT.

Figure 1:
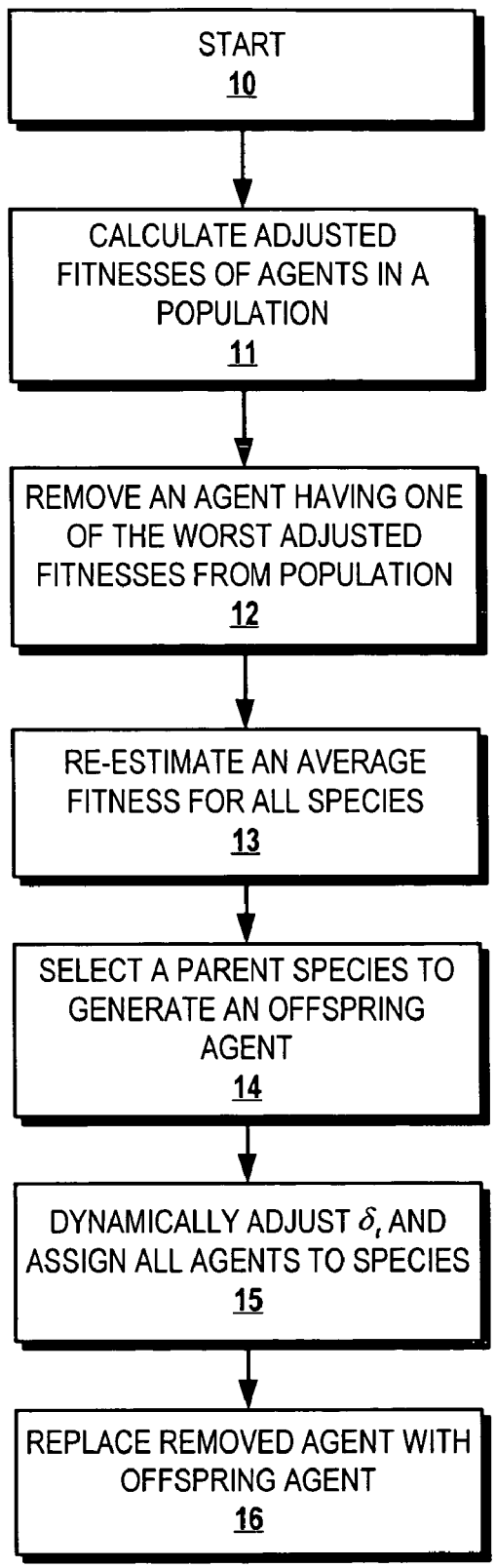
FIG. 1 is a high-level logic flow diagram of a method for providing online machine learning to agents used in video games, in accordance with a preferred embodiment of the present invention.

Referring now to the drawings and in particular to FIG. 1, there is depicted a high-level logic flow diagram of a method for providing online machine learning to agents used in video games, in accordance with a preferred embodiment of the present invention. Starting at block 10, adjusted fitnesses of all agents within a current population are calculated, as shown in block 11. Then, an agent having one of the worst adjusted fitnesses is removed from the population, as depicted in block 12, provided the agent has been alive sufficiently long such that it has been properly evaluated. If all the agents are grouped into various species, the average fitness $\bar{F}$ for all species within the population are re-estimated, as shown in block 13. At least one parent species is subsequently chosen to generate an offspring agent, as depicted in block 14. A dynamic compatibility threshold $\delta_t$ is adjusted, and all remaining agents are assigned to the chosen parent species, as shown in block 15. The removed agent (from block 12) is replaced by the offspring agent, as depicted in block 16. Each of the steps in FIG. 1 is discussed in more detail as follows.

Calculating adjusted fitness (block 11): Let $f_i$ be the original fitness of agents i. For all agents i, fitness sharing adjusts $f_i$ to $f_i/|S_i|$ where $|S_i|$ is the number of agents in the species of agent i.

Removing one of the worst agents (block 12): The goal is to remove a poorly performing agent from the video game in order to replace it with a better agent. The agent is chosen carefully to preserve speciation dynamics. If an agent with the worst unadjusted fitness were chosen, fitness sharing could no longer protect innovation because new topologies would be removed as soon as they appear. Thus, the agent with the worst adjusted fitness should be removed, since adjusted fitness takes into account species size, so that new, smaller species are not removed as soon as they appear.

It is important that agents are evaluated sufficiently before they are considered for removal. In rtNEAT, new agents are constantly being born, meaning various agents have been around for different lengths of time. Therefore, only agents who have played for more than the minimum amount of time are removed. The minimum time parameter is set experimentally, preferably by observing how much time is required for an agent to execute a substantial behavior in a video game.

Re-estimating $\bar{F}$ (block 13): If there is an agent that is old enough to be removed, the average fitness $\bar{F}$ of its corresponding species is likely to be changed because the species will have one less agent. It is important to keep $\bar{F}$ up-to-date because $\bar{F}$ is used in choosing the parent species in the next step. Therefore, $\bar{F}$ needs to be calculated in each step. Although, in the present embodiment, all agents within the population are grouped into various species, it is understood by those skilled in the art that it is not necessary to group agents into species such that a population includes only agents.

Generating an offspring agent (block 14): Only one offspring agent is generated at a time. The parent species is probabilistically chosen using a diversity-maintenance technique as follows:

$$Pr(S_k) = \frac{\bar{F}_k}{\bar{F}_{tot}} \quad (1)$$

where $Pr(S_k)$ is the probability of choosing parent species $S_k$, $\bar{F}_k$ is the average fitness of species k, and $\bar{F}_{tot}$ is the total of all species' average fitnesses. According to equation (1), the probability of choosing a given parent species is proportional to its average fitness compared to the total of all species' average fitnesses. Thus, over the long run, the expected number of offspring agents for each species is proportional to the number of agents assigned to each species in the NEAT method, preserving the speciation dynamics of the NEAT method. A single new offspring agent is generated by combining two agents from the parent species or mutating a single parent. With a very low probability, a single agent from the parent species is occasionally combined with an agent from a randomly-selected species.

Reassigning agents to all species (block 15): The dynamic compatibility threshold $\delta_t$ keeps the number of species in the NEAT method relatively stable throughout evolution. Such stability is particularly important in a real-time video game since the population may need to be small in order to accommodate processor resources dedicated to graphics processing.

In the NEAT method, $\delta_t$ can be adjusted before the next generation is created. In rtNEAT, changing $\delta_t$ alone is not sufficient because most of the population would still remain in their current species. Instead, the entire population must be reassigned to the existing species based on the new $\delta_t$. As in the NEAT method, if a network does not get assigned to any of the existing species, a new species is created with that network as its representative. Depending on the specific video game, species do not need to be reorganized at every replacement. The number of game ticks between adjustments can be chosen by a game designer based on how rapidly species evolve.

Replacing removed agent with offspring agent (block 16): Since an agent was removed in block 12, the offspring agent is utilized to replace the removed agent. How agents are replaced depends on the video game. In some video games, the neural network can be removed from a body and replaced without doing anything to the body. In others, the body may have been destroyed and need to be replaced as well. The rtNEAT algorithm can work with any of the above-mentioned schemes as long as an old neural network gets replaced by a new one.

The rtNEAT algorithm is necessary to approximate the NEAT method in real-time. One remaining issue is to select the best value for n, the number of ticks between applications of rtNEAT algorithm loop. If agents are replaced too frequently, they do not live long enough to reach the minimum time to be evaluated. On the other hand, if agents are not replaced frequently enough, evolution slows down to a pace that a video player no longer enjoys.

The appropriate frequency can be determined through a principled approach. Let I be the fraction of the population that is too young and therefore cannot be replaced, n be the number of game ticks between replacements, m be the minimum time for an agent to be alive, and |P| be the population size. A law of eligibility can be formulated that specifies what fraction of the population can be expected to be ineligible once evolution reaches a steady state (i.e., after the first few time steps when no one is eligible):

$$I = \frac{m}{|P|n} \quad (2)$$

According to equation (2), the larger the population and the more time between replacements, the lower the fraction of ineligible agents. This principle makes sense since in a larger population, it takes more time to replace the entire population.

Also, the more time passes between replacements, the more time the population has to age, and fewer agents are ineligible. On the other hand, the larger the minimum age, the more are below it, and fewer agents are eligible to be replaced.

The ratio m/n can be thought of as the number of agents that must be ineligible at any time; over the course of m game ticks, an agent is replaced every n game ticks, and all the new agents that appear over m game ticks will remain ineligible for that duration since they cannot have been around for over m game ticks. For example, if |P| is 50, m is 500, and n is 20, 50% of the population would be ineligible at any time.

Based on the law of eligibility, rtNEAT can decide on its own how many game ticks n should lapse between replacements for a preferred level of ineligibility, specific population size, and minimum time between replacements:

$$n = \frac{m}{|P|I} \quad (3)$$

It is best to let a user choose I because in general it is most critical to performance; if too much of the population is ineligible at one time, the mating pool is not sufficiently large. Equation (3) then determines the appropriate number of game ticks between replacements.

Figure 2:
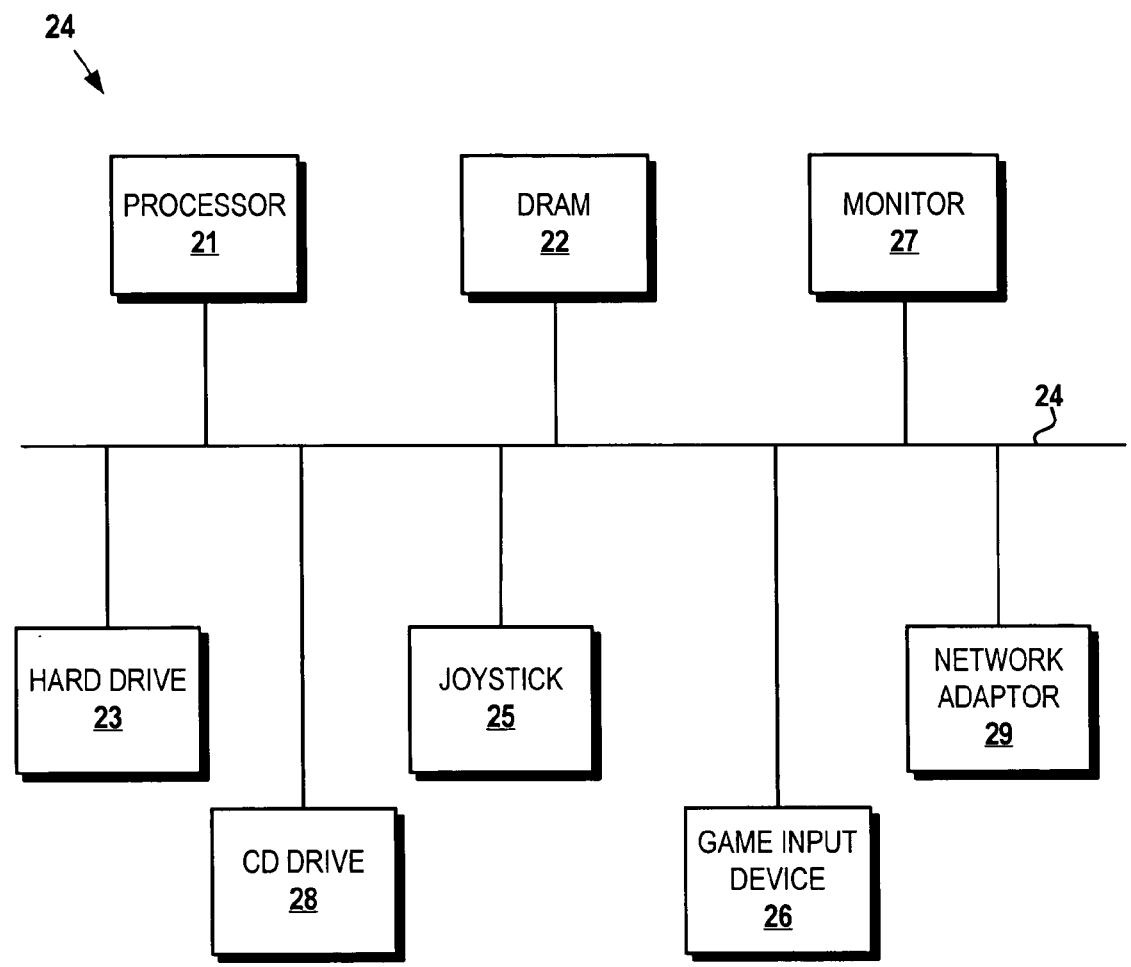
FIG. 2 is a block diagram of a video game system in which a preferred embodiment of the present invention can be incorporated.

With reference now to FIG. 2, there is depicted a block diagram of an example of a video game system in which a preferred embodiment of the present invention can be incorporated. As shown, a video game system 20 includes a processor 21, a dynamic random access memory 22 and a hard drive 23, all attached to a system bus 24. Video game system 20 also includes a joystick 25 and/or a game input device 26 for receiving user input during game play. Video game system 20 may optionally include a monitor 27 for displaying video graphics, and a compact disc drive for receiving compact discs. Video game system 20 may also optionally include a network adaptor 29 for connecting to a computer network.

As has been described, the present invention provides a method and apparatus for providing online machine learning to agents used in video games. With the rtNEAT algorithm, a sequence of operations aimed at introducing a new agent into the population are repeated at a regular time interval. The new agent will replace a poorly performing agent in the population. The rtNEAT algorithm preserves the speciation dynamics of the NEAT method by probabilistically choosing a parent to form an offspring and by carefully selecting an agent to be replaced.

By performing the right operations every n game ticks, choosing the right agent to be replaced and replacing it with an offspring of a carefully chosen species, rtNEAT is able to replicate the dynamics of the NEAT method in real-time. Thus, rtNEAT can be deployed in a real-time video game and video game players can interact with complexifying agents as they evolve. Although the present invention is described in the form of video games, it is understood by those skilled in the art that the method of the present invention is also applicable to other interactive applications, such as interactive training applications, interactive simulations, and so on.

Those skilled in the art will also appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing real-time machine learning to agents used in an interactive application having multiple agents, said method comprising:
    determining adjusted fitnesses of a plurality of agents within a population;
    removing from said population an agent having a relatively low adjusted fitness;
    probabilistically selecting a parent agent from said population to generate an offspring agent; and
    replacing said removed agent with said offspring agent.

2. The method of claim 1, wherein said removing further includes removing from said population an agent having the lowest adjusted fitness.

3. The method of claim 1, wherein said selecting further includes
    dividing said population into a plurality of species;
    determining an average fitness for each of said species; and
    probabilistically selecting one of said plurality of species based on said determined average fitnesses, wherein said parent agent is chosen from said selected species.

4. The method of claim 3, wherein said selecting is performed by $$Pr(S_k) = \frac{\overline{F_k}}{\overline{F}_{tot}}$$

where $Pr(S_k)$ is the probability of choosing a species $S_k$ that contain said parent agent, $\overline{F}_k$ is the average fitness of species k, and $\overline{F}_{tot}$ is the total of all of said species' average fitnesses.

5. The method of claim 3, wherein said method further includes
    in response to a determination that the number of species within said population exceeds a first predetermined threshold, decreasing a species compatibility threshold;
    in response to a determination that the number of species within said population falls below a second predetermined threshold, increasing said species compatibility threshold; and
    reassigning said plurality of agents to corresponding species.

6. An apparatus for providing real-time machine learning to agents used in an interactive application having multiple agents, said apparatus comprising:
    means for determining adjusted fitnesses of a plurality of agents within a population;
    means for removing from said population an agent having a relatively low adjusted fitness;
    means for probabilistically selecting a parent agent from said population to generate an offspring agent; and
    means for replacing said removed agent with said offspring agent.

7. The apparatus of claim 6, wherein said removing means further includes means for removing from said population an agent having the lowest adjusted fitness.

8. The apparatus of claim 6, wherein said selecting means further includes
   means for dividing said population into a plurality of species;
   means for determining an average fitness for each of said species; and
   means for probabilistically selecting one of said plurality of species based on said determined average fitnesses, wherein said parent agent is chosen from said selected species.

9. The apparatus of claim 8, wherein said selecting means is performed by $$Pr(S_k) = \frac{\overline{F_k}}{\overline{F}_{tot}}$$

where $Pr(S_k)$ is the probability of choosing a species $S_k$ that contain said parent agent, $\overline{F_k}$ is the average fitness of species k, and $\overline{F}_{tot}$ is the total of all of said species' average fitnesses.

10. The apparatus of claim 8, wherein said apparatus further includes
    in response to a determination that the number of species within said population exceeds a first predetermined threshold, means for decreasing a species compatibility threshold;
    in response to a determination that the number of species within said population falls below a second predetermined threshold, means for increasing said species compatibility threshold; and
    means for reassigning said plurality of agents to corresponding species.

11. A computer storage medium having a computer program product for providing real-time machine learning to agents used in an interactive application having multiple agents, said computer storage medium comprising:
    computer program code for determining adjusted fitnesses of a plurality of agents within a population;
    computer program code for removing from said population an agent having a relatively low adjusted fitness;
    computer program code for probabilistically selecting a parent agent from said population to generate an offspring agent; and
    computer program code for replacing said removed agent with said offspring agent.

12. The computer storage medium of claim 11, wherein said computer program code for removing further includes computer program code for removing from said population an agent having the lowest adjusted fitness.

13. The computer storage medium of claim 11, wherein said program code means for selecting further includes
    computer program code for dividing said population into a plurality of species;
    computer program code for determining an average fitness for each of said species; and
    computer program code for probabilistically selecting one of said plurality of species based on said determined average fitnesses, wherein said parent agent is chosen from said selected species.

14. The computer storage medium of claim 13, wherein said computer program code for selecting is performed by $$Pr(S_k) = \frac{\overline{F_k}}{\overline{F}_{tot}}$$

where $Pr(S_k)$ is the probability of choosing a species $S_k$ that contain said parent agent, $\overline{F_k}$ is the average fitness of species k, and $\overline{F}_{tot}$ is the total of all of said species' average fitnesses.

15. The computer storage medium of claim 13, wherein said computer storage medium further includes
    computer program code, in response to a determination that the number of species within said population exceeds a first predetermined threshold, for decreasing a species compatibility threshold;
    computer program code, in response to a determination that the number of species within said population falls below a second predetermined threshold, for increasing said species compatibility threshold; and
    computer program code for reassigning said plurality of agents to corresponding species.

16. A method for managing agent population within a video game, said method comprising:
    continuously collecting fitness statistics of agents within a video game that is being played by a player, wherein said agent population evolves continuously during said game play;
    determining a number of ticks of a simulation clock between replacements n of said agents within said video game by
        assigning a minimum lifetime m for any agent;
        choosing a number of agents |P| within said agent population;
        choosing a fraction I of said agent population, wherein said fraction is ineligible for replacement at any given simulation clock tick due to being below said minimum lifetime; and
        dividing said minimum lifetime m by the product of said number of agents |P| and said fraction I; and
    replacing a subset of said agents within said agent population after every n simulation clock ticks.

17. The method of claim 16, wherein said assigning is performed based on a minimum amount of time in simulation clock ticks necessary to complete a task.

18. The method of claim 16, wherein said choosing is performed based on the number of simultaneous agents a processor is capable of handling and the number most desirable for said player's experience.

* * * * *

UNITED STATES PATENT AND TRADEMARK OFFICE
CERTIFICATE OF CORRECTION

| | | |
|---|---|---|
| PATENT NO. | : 7,559,843 B2 | Page 1 of 1 |
| APPLICATION NO. | : 11/197065 | |
| DATED | : July 14, 2009 | |
| INVENTOR(S) | : Kenneth O. Stanley and Risto Miikkulainen | |

It is certified that error appears in the above-identified patent and that said Letters Patent is hereby corrected as shown below:

In the Specification:

Please add the following paragraph prior to the heading entitled "Background of the Invention" at column 1, line 12 of the Patent:

GOVERNMENT INTERESTS

This invention was made with government support under Grant No. 0083776 awarded by the National Science Foundation. The government has certain rights in the invention.

Signed and Sealed this
Eighteenth Day of August, 2015

Michelle K. Lee
*Director of the United States Patent and Trademark Office*